UNITED STATES PATENT OFFICE.

WILLIAM H. TRISSLER, OF BURR OAK, MICHIGAN.

IMPROVED STOVE BLACKING OR POLISH.

Specification forming part of Letters Patent No. 36,873, dated November 4, 1862.

*To all whom it may concern:*

Be it known that I, WILLIAM H. TRISSLER, of Burr Oak, in the county of St. Joseph and State of Michigan, have invented a new and useful compound to be used as a coating and polish for stoves and iron surfaces, or as a fire-proof cement in closing cracks or defects therein; and I do hereby declare the following to be a full and exact description thereof.

My improved stove-polish and fire-proof cement consists of a compound of commercial plumbago, German black-lead, calcined plaster-of-paris, and alum, which, when properly prepared and applied, will form an exceedingly durable coating for stoves and other iron surfaces, admitting of high polish and luster, and which will remain entirely unaffected by heat—a great advantage over the ordinary compounds in use for this purpose. This compound may also serve as a strongly-adhesive cement, admirably adapted for closing cracks in such iron-work.

To enable others to make my improved stove-polish and cement, I will proceed to describe its manufacture.

I take of pure calcined plaster-of-paris twenty pounds, and, placing it in a suitable vessel, gradually add water thereto and stir up the mass until it is reduced to the consistency of cream and is perfectly smooth and free from lumps. To this thin semi-fluid paste I add two hundred pounds of plumbago, fifty pounds of German black-lead, and one-half pound of alum previously dissolved in a quart of boiling water, and continue stirring the mass by a hoe or other suitable implement, adding more water, if required, until the ingredients are thoroughly mixed into a thick paste of uniform consistency. After the several ingredients have thus been mixed together the compound is allowed to stand in a covered vessel some four or five hours to insure a perfect dissolution of the plumbago. The mass is then worked over a second time, effecting thereby a more thorough union and incorporation of the several ingredients with each other. After the paste thus formed has acquired, by exposure to the ordinary temperature of the atmosphere, the density and consistency of common putty, it is placed into small molds of the shape and pattern desired in commerce, and is then exposed to a moderate heat for a few hours until the blocks or cakes of polish have slightly shrunken. These cakes are then stacked in a suitable apartment until they are perfectly hardened, when they are ready for packing and sale.

The molds which I use to give proper form to the compound when worked into a stiff paste are similar to those used by brick-makers, (being open above and below,) and may be made of wood or metal. They are arranged for convenience in series containing fifty or more compartments or molds in one group. When in use they are placed upon a hard, smooth table. After they are filled the superfluous paste is cut off therefrom by drawing a very fine wire or other thin edge of metal over their surface, and the face of each cake of paste is rendered perfectly smooth by the use of a metal bar passed over the same. After the upper surfaces of the cakes of paste in the molds have thus been made smooth and uniform, the molds are reversed and the operation repeated on the opposite faces, when they are ready to be submitted to the moderate heat, which will permit their removal.

In using my improved polish it is to be mixed with water until reduced to the consistency of cream, applied to the stove or other surface when cold, and by being immediately rubbed with a brush before it dries will produce a most brilliant and durable polish, preventing entirely the action of rust. When used as a cement it is to be mixed to the consistency of putty and allowed to dry gradually. Its affinity for the surface of iron renders it very durable and efficacious for this purpose.

The plumbago which I use is the ordinary plumbago of commerce. It serves to fill up the minute pores and interstices of the iron-work and to make a perfectly smooth surface. I add the German black-lead, which is the article generally known and sold under that name, to attain a finer surface than the coarser but more durable plumbago would create. The plaster named is a fine quality of the calcined plaster-of-paris of commerce. The addition of this ingredient renders the composition proof against the effects of fire, and there is consequently no smoke or disagreeable smell arising from the polish upon its subjection to heat. The caustic and adhesive quality of the plaster, in connection with the properties of the other ingredients, renders the compound unsurpassed in its adhesive character and gives it superior advantages as a permanent coating or cement. The mordant characteristic of the remaining ingredient—viz., ordinary refined commercial alum—adds greatly to the durability and beauty of my invention, forming in the compound an acid which seizes the iron firmly, rendering the coating permanent, while at the same time it renders the polish unsurpassingly hard and brilliant.

The proportions of the several component parts of my fire-proof polish may be varied without materially affecting the utility of my invention, although I have found the formula above described to be the best for general use. The German black-lead may also be altogether omitted as an ingredient in my invention without detracting from its useful nature, and I do not therefore desire to confine myself to its use as a necessary ingredient in the compound.

What I claim as my invention, and desire to secure by Letters Patent, is—

The combination of plumbago, or plumbago and German black-lead, with calcined plaster-of-paris and alum, substantially in the manner and for the purposes herein set forth.

The above specification of my improved stove-blacking signed by me this 16th day of September, A. D. 1862.

WILLIAM H. TRISSLER.

In presence of—
O. C. COWLES,
O. L. CRANMER.